April 5, 1960     A. H. J. DE LASSUS ST. GENIES     2,931,269
PROJECTION SCREEN WITH REFLEX LIGHT-TRANSMISSION
Filed Dec. 14, 1955                                    2 Sheets-Sheet 2
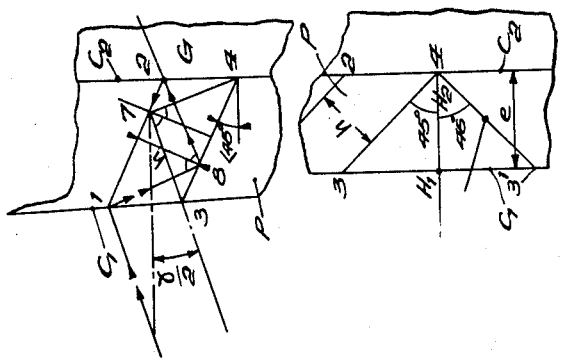
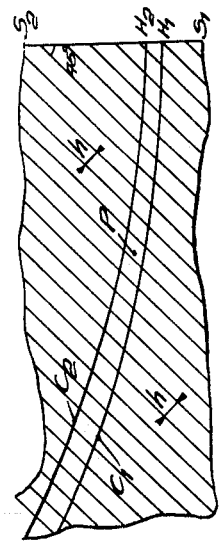
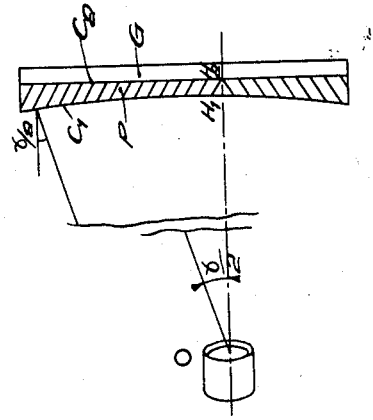
INVENTOR
Anne Henri Jacques DeLassus
St. Genies
BY Stone & Mack
ATTORNEYS

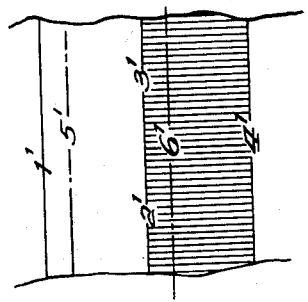
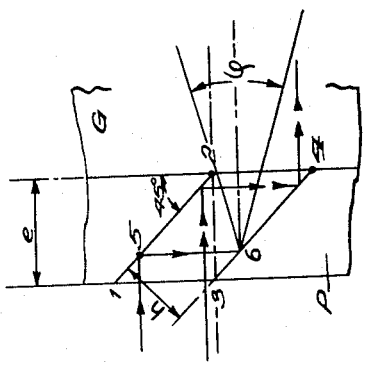
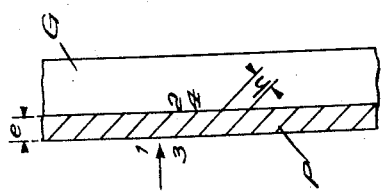

United States Patent Office 2,931,269
Patented Apr. 5, 1960

2,931,269

PROJECTION SCREEN WITH REFLEX LIGHT-TRANSMISSION

Anne Henri Jacques de Lassus St. Genies, Paris, France

Application December 14, 1955, Serial No. 553,138

Claims priority, application France December 17, 1954

4 Claims. (Cl. 88—28.9)

The present invention relates to new improved projection screens for motion pictures or slides.

It is known that a diffusing surface observed by transparency is likely to delimit in the theater a rather narrow zone wherein the projected images appear with uniform brightness over the whole screen area. This zone has for synmmetrical plane the vertical plane perpendicular to the screen containing the axis of the projector lens and does not extend very far on both sides of this plane. If extending of this zone is sought by increasing the diffusing power of this surface, this is accompanied by a drop in the transmission of light.

It has been disclosed in the prior art to provide a device having a cellular or channeled screen adapted to receive and reproduce in light, shade and color, objects or forms projected thereon from behind. Such a device has a uniform structure throughout its area and cannot produce an evenly illuminated surface when a divergent beam of light, i.e. of a projector, covers the screen.

It is proposed to palliate these drawbacks of the diffusing surfaces to be viewed by transparency, as known in the art, in the following way:

It is an object of the invention to build a projection screen with reflex light transmission in which the light is evenly distributed over the whole screen area as seen by an observer. This object is accomplished by forming a screen of the nature specified with two symmetrical parts with respect to the projector axis and with varying inclination and width of the reflector members in relation to their distance from the said axis.

Fig. 1 is a sectional view of a screen with reflection members.

Figs. 1a and 1b are respectively a diagrammatic view in cross section and elevation of a small portion of the reflection member assembly of Fig. 1.

Fig. 2 is a diagrammatic cut in a pile of reflector sheets which must be cut in bulk to form a screen.

Fig. 3 is a vertical cross section of a symmetrical screen, according to the invention.

Fig. 3a is a cut away section of a screen according to the invention.

Figure 1 represents a sectional view of a small portion thereof along a vertical plane parallel to the axis of the projection lens. The diffusing plane surface of an ordinary screen is replaced by a vertical plane partition P perpendicular to the plane of the figure of a given thickness $e$ attached to a transparent plane-support G, for instance a glass-plate. This partition P is composed of a pile of identical elements of plastic material preferably perfectly transparent, each element shown in 1, 2, 3 and 4, being a prism the ridges of which delimit four plane facets perpendicular to the plane of the figure i.e. horizontal, which have a length equal to the width of the screen. The section of this prism along the plane of the figure is a parallelogram the sides 1—2 and 3—4 of which are inclined preferably to 45° on the support plane G and on the principal optical axis of the projection lens. The total of these prisms is fixed by the same facet 2—4 for each to this support G for instance by an adhesive. From the interior of each of these prismatic elements, the facet 1—2 considered much enlarged in Figure 1a is polished and constitutes a mirror reflective to a high degree, by applying a metal before piling and fixing the prismatic elements. The facet 3—4 parallel to 1—2 has preferably an unpolished or even a rough aspect and is also before fixing covered with a white coating diffusing by reflexion.

If the screen is a small one, it is associated with a lens covering same entirely at the side of the projection lens and the partition P is subjected to light-beams thus made substantially parallel to the axis of the projection lens. Any facet such as 3—4 of the assembly of the prismatic elements constituting the partition can only receive the light coming from this lens after a first reflection on a facet 1—2. After this deviated course, the light received by the spectators in a space situated beyond the glass-plate G can only reach them from the facets 3—4 of said partition, i.e. after the characteristic second reflexion of the total of said facets 3—4 constituting this partition. The repartition of the light coming from a such reflexion will then occur uniformly in a space much larger than that determined by the use of a diffusing surface to be observed by transparency. This result will be obtained owing to a higher light-output.

Such partitions are made for instance as follows: Plane sheets of transparent plastic material with constant small thickness with $h=e/\sqrt{2}$ for instance, of rather large dimension, are given a reflecting silvering on one of their polished faces and a diffusing white coating on the other face, preferably non-polished, or successively two such coatings on the sole polished face. These sheets are piled and laminated together in a great number. Further, they are cut in thicknesses $e$ according to a same inclination to 45° on each of them, so that in a partition thus manufactured the diagonal 2—3 of each prismatic element is perpendicular to the faces delimiting said partition P. On this condition, no light-ray coming from the front part of the screen and normal thereon on entering same comes to the rear part without having undergone both successive characteristic reflexions on the facets 1—2 and 3—4 of all the prismatic elements of the partition P.

Inevitably, there is a small loss of light—whatever the size of the screen may be—on the figure from the point 6 to the point 3 of any facet 3—4 because of the interception by the facet 1—2 of part of a diffusion cone, originating from the light rays which are reflected on the part 3—6 of the facet 3—4. It may be avoided by striating for instance by goffering the facet 3—4 of the prismatic elements. The solid repartition cone of the light in the viewing space may have two values in the vertical plane and in the horizontal plane, and in this way the space for the spectators which in general is much broader than the space is high is used to the best advantage.

In the case of middle and large screens, wherein lenses as suggested above can practically not be used, and in order that a double reflexion typical for the use of these partitions is obtained with the best result over the whole extent of the screen, the inclination of the facets of each prismatic element of the partition must vary on the transparent support G starting from the horizontal line of this screen whereon the principal axis OH of the projection lens crosses the plane of the partition and this alternative must occur continuously and progressively as one shifts in one or the other direction from the horizontal line to the upper part or to the lower part of this partition P.

For this purpose, considering Figure 2, the partition is composed of two parts separated by a horizontal cut $H_1H_2$ at the point where the principal axis $H_1H_2$ of the projection lens perpendicular to this partition must cross it and also cross its support G.

On the other hand in the manufacture of this partition, the pile of sheets with a thickness equal to $h$ is cut after laminating one to the others, no longer according to two parallels inclined to 45° on the plane of these sheets, but according to the faces of two cylinders $C_1$ and $C_2$ for instance at constant distance or not. Since the thickness $h$ of the piled and laminated sheets is small and constant, it may be considered that the elements such as 1, 2, 3, and 4 taken separately remain prismatic on any point of the screen. This partition is not used under its cylindrical form. After leveling this partition in one of its faces, which can readily be done with plastic sheets, it is laminated on the plane G. In the plane of Figure 2, the cylindrical surfaces $C_1$ and $C_2$ have as origin the points $H_1$ and $H_2$ where these surfaces are perpendicular in a same plane $S_1S_2$ cutting at 45° for instance the planes of the accumulated sheets with a thickness equal to $h$. A complete partition is then composed of two half partitions leveled and laminated by opposition one to the other, at level of the cuts $H_1$ and $H_2$ on a same flat glass-plate G in contact there with for instance by their respective faces $C_2$.

Thus at the bottom of Figure 3a, the facets 3—4 and 3'—4 of the first prismatic elements of these two half-partitions are opposed to 90°, one in respect of the other. The complete partition is thus placed in the screen such that the main axis of the projection lens perpendicular thereto crosses it on this cut. Figure 3a shows also a detail view of a prismatic element considered at the upper or lower edge of the partition remote from the cut $H_1H_2$. At level of this cut, the incidental light-beams on it are perpendicular to the partition P and in this region, the prismatic elements behave as explained in the three figures.

In all the prismatic elements different from those most adjacent to the cut $H_1H_2$, and in a more accentuated way in proportion as one moves from this cut to the edges of the screen, it does not suffice anymore in order that this double reflexion occurs surely with the best result, that the line 3—2, already considered in Figure 1a be parallel to the direction of the light at the point where it reaches the partition. Indeed, let us consider at the top of Figure 3a, the prismatic element of the partition remote from $H_1H_2$ and the angle of incidence $\gamma/2$ of the light beams issued by the lens on the plane of the glass-plate G, support of the partition in this region.

It is shown at the top of Figure 3a that if the light beam which ends at the point 2 of the face $C_2$ came directly from the projection lens according to the direction 8—2, the whole fraction 7—2 of the reflecting facet 1—2 would throw the light in the room without undergoing the characteristic second reflexion on the facet 3—4.

A continuous variation from the cut $H_1H_2$ of the partition of the inclination of facets 1—2 and 3—4 of the prismatic elements added to a continuous variation of the thickness of this partition measured perpendicularly to this glass-plate G are a sufficient help for the perturbation caused by these losses.

I claim:

1. A projection screen with reflex light transmission, comprising a partition formed by piling long strips of transparent material with substantially parallelogrammic cross section, the junction between strips being formed by a layer which forms a mirror on one side and a light diffusing surface on the other side, said junction layers forming such angles with respect to the partition surfaces and placed at such a mutual distance that the specular image formed on the mirror side of each junction layer by the projector is projected on the diffuse surface of the adjacent layer, thereby covering its whole surface so that it may be viewed in all details by an observer behind the screen, characterized by the fact, that the upper half of the screen has its layer angles symmetrical with those of the lower half.

2. A projection screen as claimed in claim 1, in which the thickness of the partition at its center is equal to the square root of 2 multiplied by the thickness of the transparent strips between the junction layers.

3. A projection screen with reflex light transmission, comprising a partition formed by piling long strips of transparent material with substantially parallelogrammic cross section, the junction between strips being formed by a layer which forms a mirror on one side and a light diffusing surface on the other side, said junction layers forming such angles with respect to the partition surfaces and placed at such a mutual distance that the specular image formed on the mirror side of each junction layer by the projector is projected on the diffuse surface of the adjacent layer, thereby covering its whole surface so that it may be viewed in all details by an observer behind the screen, characterized by the fact, that the upper half of the screen has its layer angles symmetrical with those of the lower half, the said angles increasing progressively from an angle of 45° at the center of the screen to the edges of the screen containing the two outer prismatic strips, the width of the said prismatic strips increasing from the center of the screen to the edges of said screen containing the two outer prismatic strips.

4. A projection screen as claimed in claim 3 in which the thickness of the partition at its center is equal to the square root of 2 multiplied by the thickness of the transparent strips between the junction layers.

References Cited in the file of this patent

UNITED STATES PATENTS

| | | |
|---|---|---|
| 830,398 | Wood | Sept. 4, 1906 |
| 1,271,800 | Sutton | July 9, 1918 |
| 2,053,173 | Astima | Sept. 1, 1936 |
| 2,132,904 | Martinez et al. | Oct. 11, 1938 |
| 2,398,799 | Miller | Apr. 23, 1946 |
| 2,689,387 | Carr | Sept. 21, 1954 |

FOREIGN PATENTS

| | | |
|---|---|---|
| 458,509 | Great Britain | Dec. 14, 1936 |